(12) United States Patent
Cristovao (10) Patent No.: US 9,750,273 B2
(45) Date of Patent: Sep. 5, 2017

(54) APPARATUS FOR VACUUM TUMBLING AND BARBECUING FOOD AND METHOD OF USE

(71) Applicant: Rogerio Paulo Vicente Cristovao, Taichung (TW)

(72) Inventor: Rogerio Paulo Vicente Cristovao, Taichung (TW)

( * ) Notice: Subject to any disclaimer, the term of this patent is extended or adjusted under 35 U.S.C. 154(b) by 0 days.

(21) Appl. No.: 14/687,896

(22) Filed: Apr. 15, 2015

(65) Prior Publication Data

US 2015/0216215 A1 Aug. 6, 2015

Related U.S. Application Data

(63) Continuation-in-part of application No. 13/957,551, filed on Aug. 2, 2013.

(30) Foreign Application Priority Data

Apr. 15, 2014 (TW) .............................. 103206511 U (51) Int. Cl.
| | | |
|---|---|---|
| *B65D 81/20* | (2006.01) | |
| *A23L 1/318* | (2006.01) | |
| *A47J 37/07* | (2006.01) | |
| *A47J 37/04* | (2006.01) | |
| *A23L 13/70* | (2016.01) | |

(52) U.S. Cl.
CPC .............. *A23L 1/318* (2013.01); *A23L 13/70* (2016.08); *A47J 37/041* (2013.01); *A47J 37/0704* (2013.01); *A47J 37/0786* (2013.01)

(58) Field of Classification Search
CPC ..... A23L 1/318; A47J 37/041; A47J 37/0704; A47J 37/0786
USPC ......... 426/89, 231, 281, 302, 467, 472, 512, 426/513, 531, 641, 665; 99/324, 467, 99/472, 485, 516, 519, 534, 665
See application file for complete search history.

(56) References Cited

U.S. PATENT DOCUMENTS

| | | | | |
|---|---|---|---|---|
| 5,163,358 | A * | 11/1992 | Hanagan | A47J 37/0713 126/25 R |
| 2006/0068067 | A1 * | 3/2006 | Zimmerman | A23L 1/01 426/281 |
| 2007/0227369 | A1 * | 10/2007 | Paumen | A23P 1/083 99/472 |

* cited by examiner

*Primary Examiner* — Dana Ross
*Assistant Examiner* — Joseph Iskra
(74) *Attorney, Agent, or Firm* — Kintner IP, LLC; Mary Frances Ludwig (57) ABSTRACT

An apparatus for vacuum tumbling and barbecuing food includes a barbecue and a vacuum tumbling container which fits inside the barbecue. The vacuum tumbling container has a vacuum valve. In an embodiment, the vacuum tumbling container is affixed to a rotatable connector of the barbecue. In another embodiment, the barbecue includes an enclosure which alternately accepts a vacuum tumbling container or food for cooking on the barbecue. In another embodiment, the apparatus includes a divider for partitioning the barbecue into subchambers, each suitable for holding a vacuum tumbling container or a cooking grate. In another embodiment the vacuum tumbling container also functions as a pressure cooker.

14 Claims, 14 Drawing Sheets

APPARATUS FOR VACUUM TUMBLING AND BARBECUING FOOD AND METHOD OF USE

CROSS REFERENCE TO RELATED APPLICATIONS

This application is a Continuation-In-Part of and claims the filing benefit under 35 U.S.C. §120 of application Ser. No. 13/957,551, filed 2 Aug. 2013. This application claims foreign priority under 35 U.S.C. §119(a-d) to Patent Application No. 0056-P037A-TW, filed in Taiwan on 15 Apr. 2014. Both of the above applications are hereby incorporated by reference.

TECHNICAL FIELD

The present invention pertains generally to food preparation, and more particularly to an apparatus for vacuum tumbling and barbecuing food.

BACKGROUND OF THE INVENTION

Vacuum tumbling is a process by which food is marinated, meaning steeped or soaked in a marinade (sauce). Marinating enriches the flavor of food or tenderizes it. The conventional marinating process involves soaking food for an extended period of time, frequently overnight. In the vacuum tumbling process, food and marinade are placed in a container, put under vacuum pressure, and tumbled. Vacuum tumbling tenderizes food and significantly reduces the time required to marinate food, often to 15-20 minutes, as is well known in the art.

Vacuum tumbling machines are used commercially to marinate large volumes of food. Consumer vacuum tumblers are available for marinating small volumes of food, but are relatively expensive.

Barbecuing (also spelled barbequing) is a method of cooking food over an open fire. A barbecue device is typically loaded with solid fuel such as charcoal or hardwood, the fuel is ignited, and the food is placed on a cooking grate over or near the burning solid fuel. In rotisserie style barbecuing, food is attached to a rod, shaft, or spit and rotated next to or over the solid fuel.

BRIEF SUMMARY OF THE INVENTION

The present invention is directed to an apparatus for vacuum tumbling and barbecuing food. In an embodiment, the apparatus includes a barbecue and a vacuum tumbling container which rotatably connects to the barbecue. The vacuum tumbling container has a vacuum valve.

The apparatus provides multiple functions: (1) vacuum tumbling when food and marinade are placed in the vacuum tumbling container, the contents of the vacuum tumbling container are brought to vacuum pressure, the vacuum tumbling container is rotatably connected to the barbecue and rotated; (2) cooking the food with the barbecue; and (3) pressure cooking the food in the vacuum tumbling container.

In another embodiment, the barbecue has a rotatable connector and the vacuum tumbling container is removably affixed to the connector so that when the connector rotates the vacuum tumbling container also rotates.

In another embodiment, the barbecue has at least one enclosure and the vacuum tumbling container fits inside the enclosure.

In another embodiment, the enclosure operates as a cooking structure, and may alternately enclose a vacuum tumbling container or food for barbecuing.

In another embodiment, the barbecue has an internal chamber and a cooking grate. The apparatus includes a divider which fits inside the internal chamber and partitions the internal chamber into a plurality of subchambers. Each subchamber is configured to hold a vacuum tumbling container, a cooking grate, or both.

In another embodiment, the divider includes a plurality of subdividers.

In another embodiment, the barbecue has a primary chamber and a secondary chamber removably attached to the primary chamber. The vacuum tumbling container is rotatably connectable to the secondary chamber. An aperture is positioned to allow air to flow between the primary chamber and the secondary chamber.

In another embodiment, the vacuum tumbling container includes a locking lid, which allows the vacuum tumbling container to function as a pressure cooker. An over-pressure release valve and the vacuum valve are interchangeably connectable to the vacuum tumbling container.

Other embodiments, in addition to the embodiments enumerated above, will become apparent from the following detailed description, taken in conjunction with the accompanying drawings, which illustrate, by way of example, the principles of the apparatus and method of use.

DESCRIPTION OF DRAWING REFERENCE NUMERALS 20 apparatus
22 barbecue
24 internal chamber
26 subchamber
27 first chamber
28 second chamber
29 aperture
30 connector
34 enclosure
36 cooking structure
38 cooking grate
40 vacuum tumbling container
41 body
42 vacuum valve
43 over-pressure release valve
44 pressure gauge
45 lid
46 handle
47 latch
48 clamp
49 paddle
50 divider
52 subdivider
600 food
700 vacuum pump
800 marinade
900 air

DETAILED DESCRIPTION OF THE INVENTION

Figure 1:
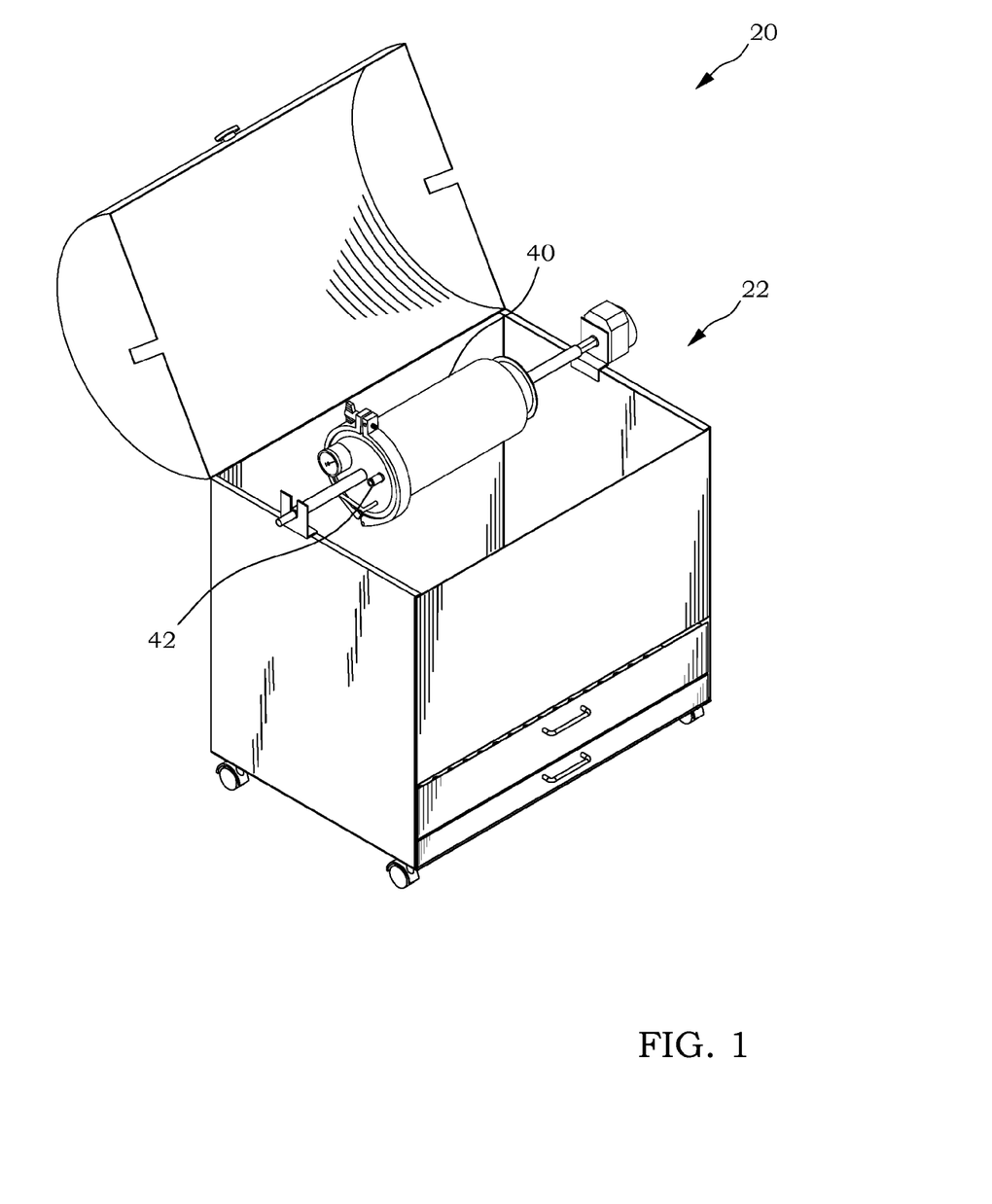
FIG. 1 is a perspective view of an apparatus for vacuum tumbling and barbecuing food.

Referring initially to FIG. 1, there is illustrated a perspective view of an apparatus for vacuum tumbling and barbecuing food. The apparatus is generally designated as 20 and the food designated as 600 (refer to FIG. 6). Apparatus 20 comprises a barbecue 22 and a vacuum tumbling container 40. Vacuum tumbling container means a container suitable for holding food and marinade under vacuum pressure. The term vacuum as used herein refers to a partial vacuum, or state of reduced pressure, and does not refer to a perfect vacuum, meaning the absolute absence of matter. Vacuum tumbling container 40 is shaped and dimensioned to rotatably connect to barbecue 22. Rotatably connect means that vacuum tumbling container 40 connects to barbecue 22 in a manner which permits vacuum tumbling container 40 to freely rotate about at least one axis. Vacuum tumbling container 40 has a vacuum valve 42.

Figure 2:
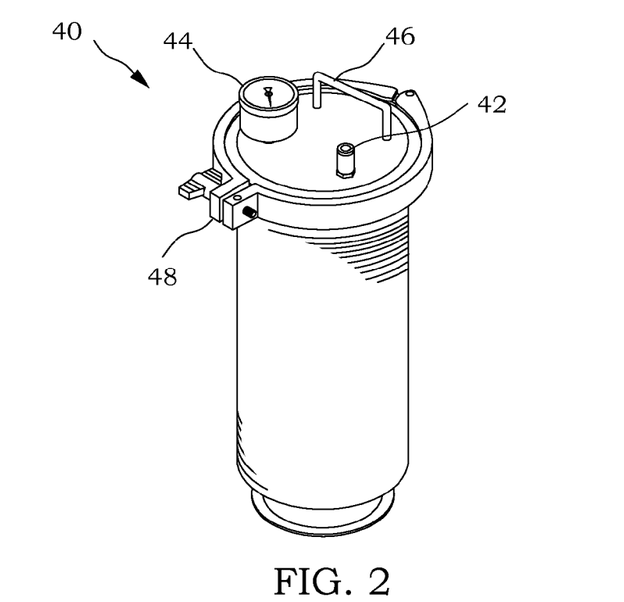
FIG. 2 is an enlarged perspective view of a vacuum tumbling container.

FIG. 2 is an enlarged perspective view of vacuum tumbling container 40 showing vacuum valve 42. Various types of vacuum valves may be employed, including vacuum check valves, vacuum breaker valves, and others well known in the art. The shown embodiment of vacuum tumbling container 40 includes a number of optional features, such as pressure gauge 44, to indicate the vacuum pressure; handle 46; and clamp 48, for sealing vacuum tumbling container 40.

Figure 3:
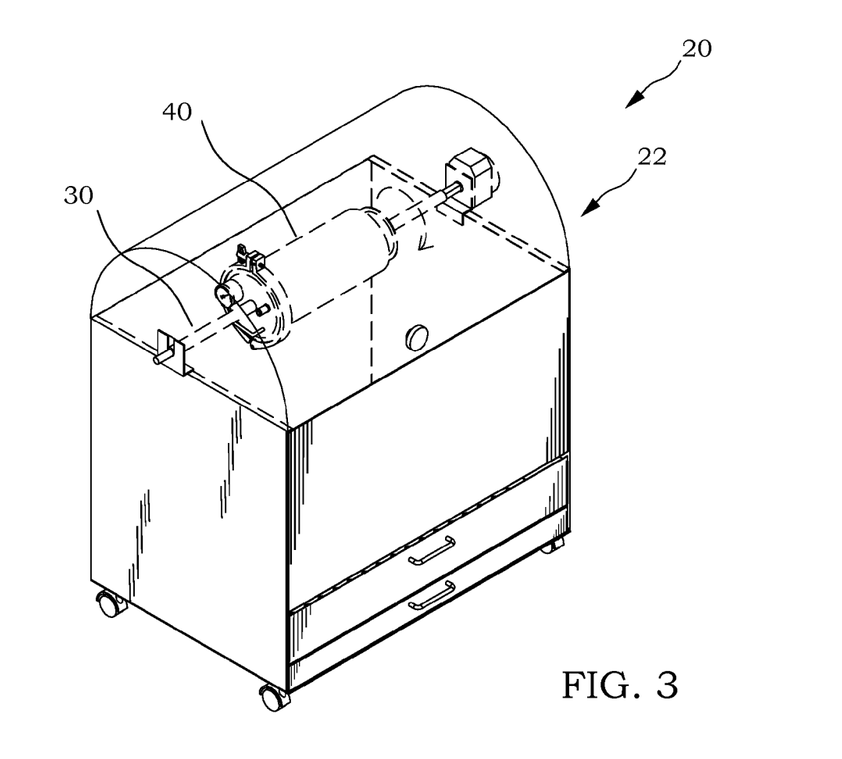
FIG. 3 is a reduced perspective view of the apparatus showing rotation of the vacuum tumbling container.

FIG. 3 is a reduced perspective view of apparatus 20 showing rotation of vacuum tumbling container 40 as indicated by the arrow. In the shown embodiment, barbecue 22 has a rotatable connector 30. Vacuum tumbling container 40 is removably attached to connector 30 so that when connector 30 rotates vacuum tumbling container 40 also rotates. Removably attached means attached in such a manner as to be readily removed. In the shown embodiment, rotatable connector 30 is a rod connected to the shaft of a motor, crank, or other rotational drive mechanism. However, other types of connector to a rotational drive mechanism may be used.

Figure 4:
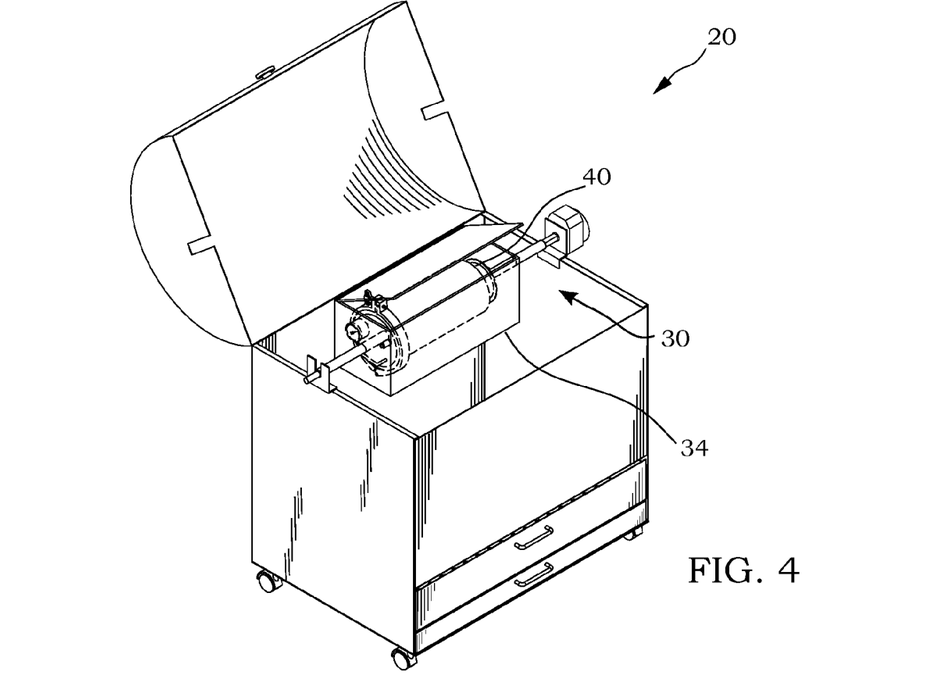
FIG. 4 is a reduced perspective view of the apparatus including an enclosure.
Figure 5:
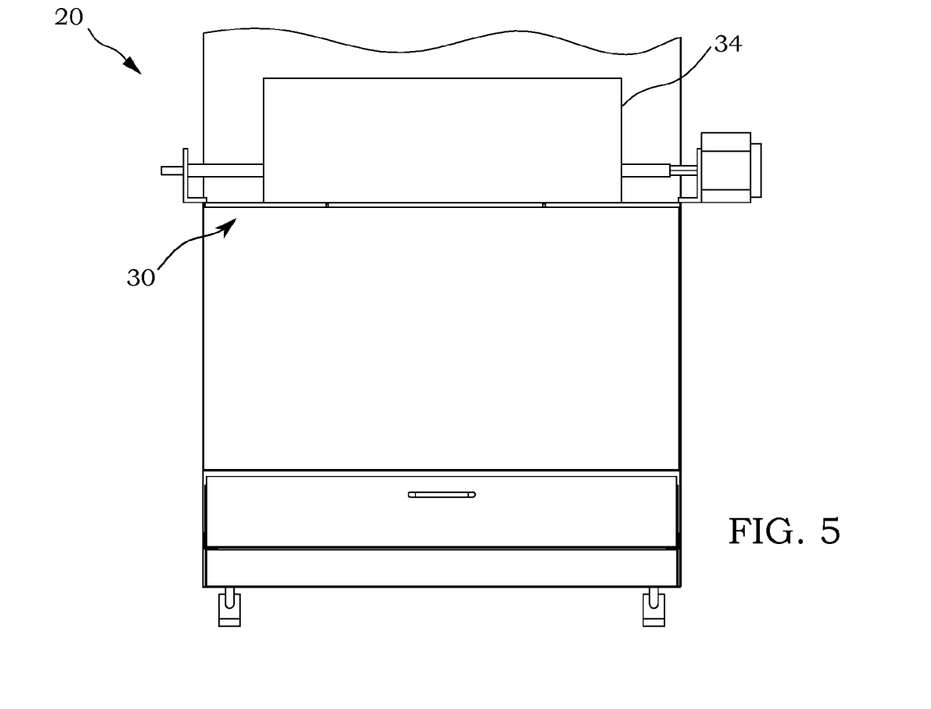
FIG. 5 is a reduced front elevation view of the apparatus including the rotatable connector.

FIGS. 4 and 5 are reduced perspective and reduced front elevation views, respectively, of apparatus 20 including barbecue 22 having an enclosure 34. Enclosure 34 is removably affixed to connector 30, for example by a threaded connection. Vacuum tumbling container 40 is shaped and dimensioned to fit inside enclosure 34. In another embodiment, barbecue 22 has multiple enclosures 34 so that more than one vacuum tumbling container 40 are removably affixed to connector 30 by fitting inside enclosures 34.

Figure 6:
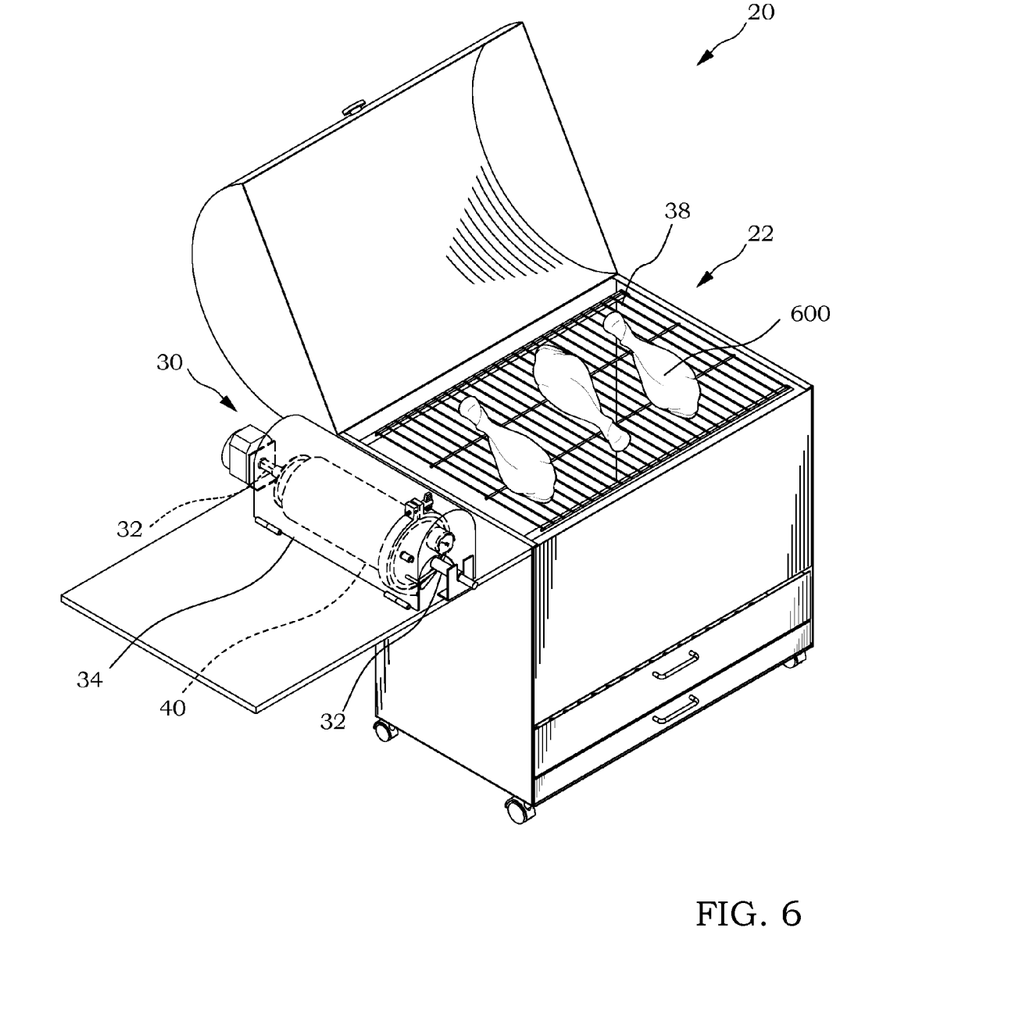
FIG. 6 is a perspective view of another embodiment of the apparatus.

FIG. 6 is a perspective view of another embodiment of apparatus 20. Barbecue 22 has a cooking grate 38, rotatable connector 30, and enclosure 34. Vacuum tumbling container 40 is rotatably connected to barbecue 22 and does not interfere with the placement or use of cooking grate 38. This embodiment enables simultaneous vacuum tumbling in vacuum tumbling container 40 and cooking food 600 on cooking grate 38.

Figure 7A:
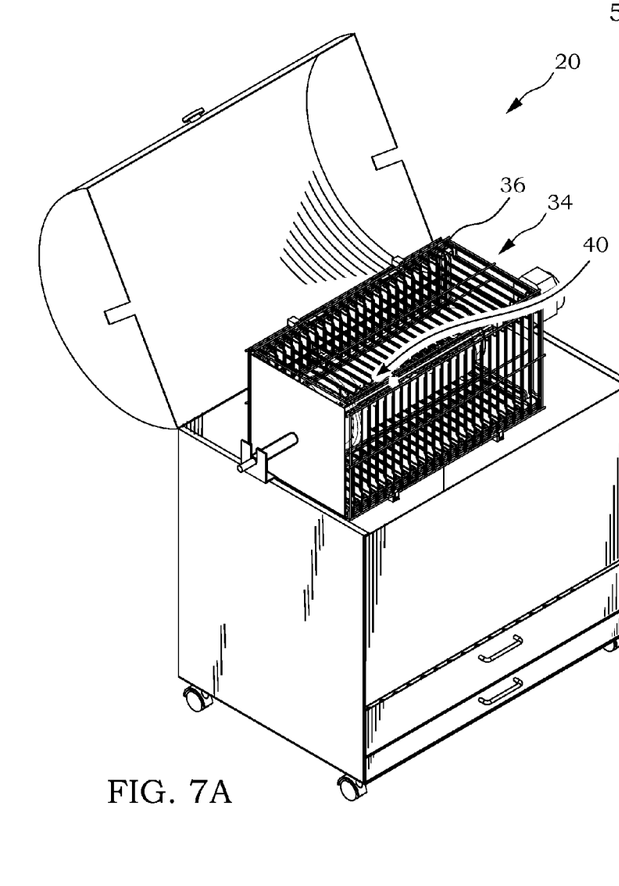
FIG. 7A is a reduced perspective view of the apparatus including an enclosure with the vacuum tumbling container inside.
Figure 7B:
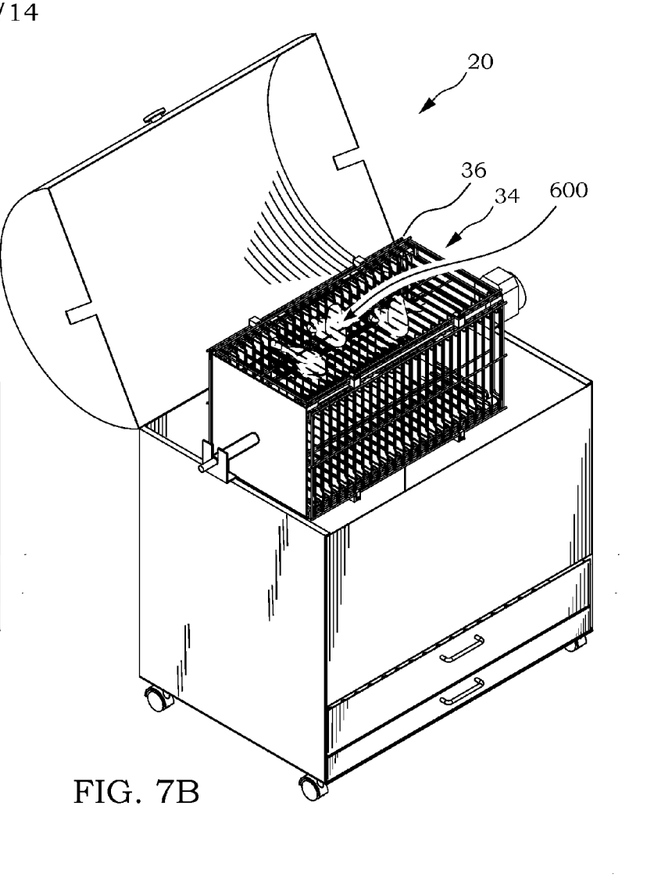
FIG. 7B is a reduced perspective view of the apparatus including the enclosure operable as a cooking structure.

FIGS. 7A and 7B are reduced perspective views of apparatus 20 including enclosure 34 operable as a cooking structure 36. Cooking structure means a structure which food 600 is placed in or on to be cooked. In the shown embodiment, vacuum tumbling container 40 may be placed inside enclosure 34 (see FIG. 7A). When vacuum tumbling container 40 is removed from enclosure 34, enclosure 34 operates as cooking structure 36 and receives food 600 for barbecuing (see FIG. 7B).

Figures 8, 9:
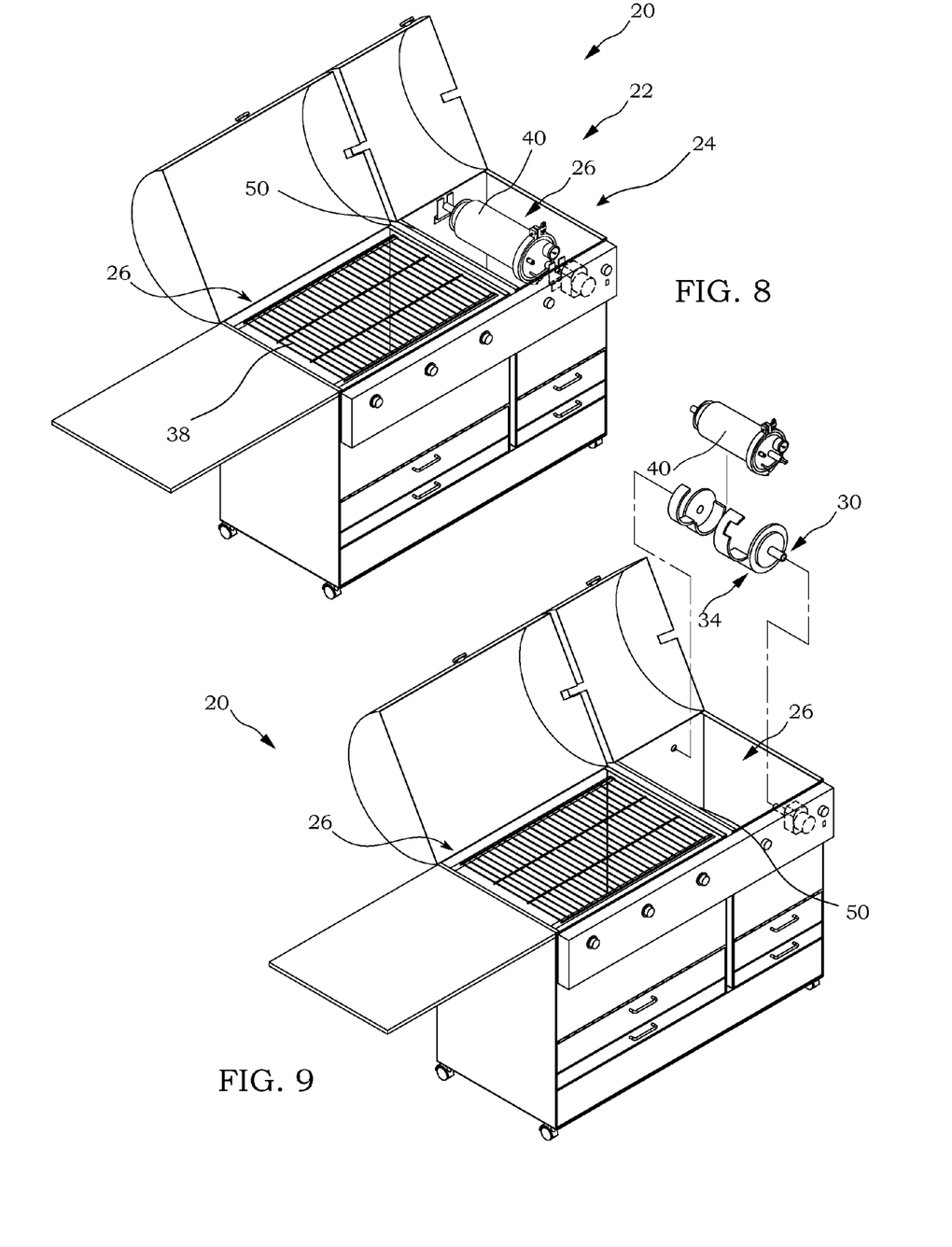
FIG. 8 is a reduced perspective view of the apparatus including a divider.
FIG. 9 is a reduced exploded perspective view of another embodiment of the apparatus.

FIG. 8 is a reduced perspective view of another embodiment of apparatus 20. Barbecue 22 has an internal chamber 24 and cooking grate 38. A divider 50 is shaped and dimensioned to fit inside internal chamber 24 of barbecue 22. When divider 50 is placed inside internal chamber 24 of barbecue 22, divider 50 partitions internal chamber 24 into a plurality of subchambers 26 (two in the shown embodiment). Each subchamber 26 is shaped and dimensioned to hold at least one of vacuum tumbling container 40 and cooking grate 38. This means that each subchamber 26 can hold either a vacuum tumbling container 40, a cooking grate 38, both, or more than one of each. In another embodiment, divider 50 partitions internal chamber 24 into four subchambers 26. In another embodiment, one of subchambers 26 is suitable for alternately holding one vacuum tumbling container 40 or one cooking grate 38.

FIG. 9 is a reduced exploded perspective view of another embodiment of apparatus 20 including divider 50. In the shown embodiment, one subchamber 26 holds rotatable connector 30. An enclosure 34 is removably affixed to rotatable connector 30. Vacuum tumbling container 40 is shaped and dimensioned to fit inside enclosure 34.

Figure 10:
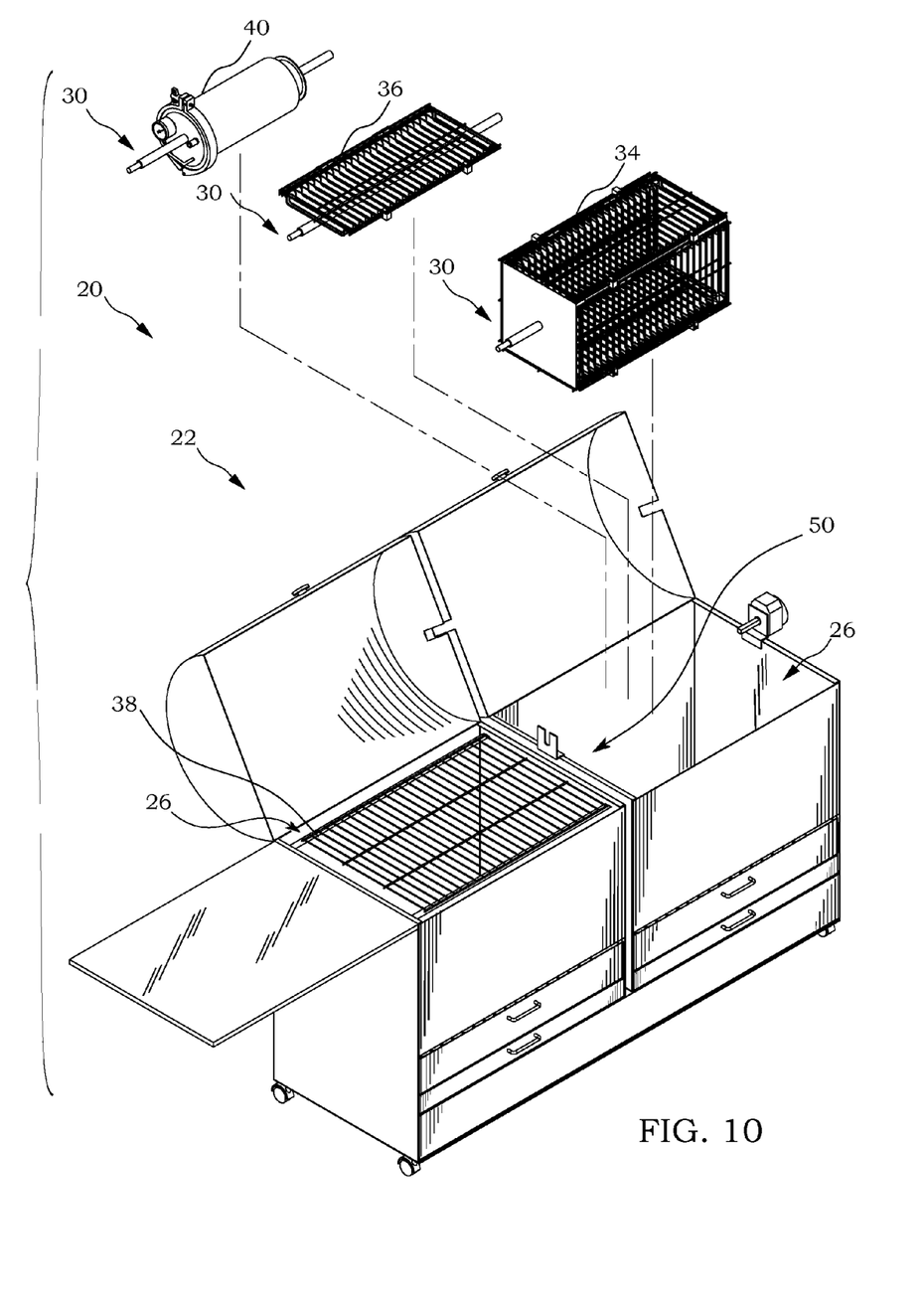
FIG. 10 is a reduced perspective view of another embodiment of the apparatus.

FIG. 10 is a reduced perspective view of another embodiment of apparatus 20. Barbecue 22 includes divider 50 and is partitioned into a plurality of subchambers 26. One subchamber 26 is shaped and dimensioned to hold cooking grate 38. Another subchamber 26 is shaped and dimensioned to hold vacuum tumbling container 40 which is removably affixed to rotatable connector 30. In the shown embodiment, different elements may be removably affixed to connector 30 including vacuum tumbling container 40, cooking structure 36, and enclosure 34 operable as a cooking structure 36. Elements which are removably affixed to connector 30 may be interchanged throughout the food preparation process. Other configurations may be readily envisioned where elements suitable for rotisserie food preparation are removably affixed to connector 30, such as a spit, coffee roaster, or others.

Figure 11:
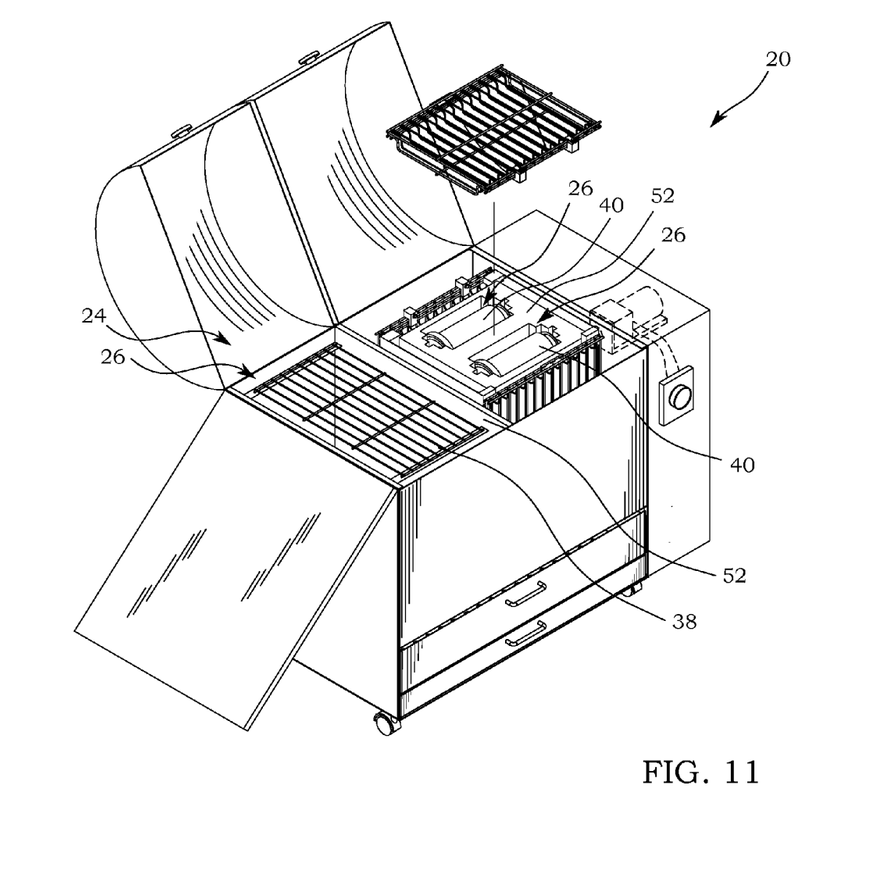
FIG. 11 is a perspective view of the apparatus including a plurality of subdividers.

FIG. 11 is a perspective view of apparatus 20 further including a plurality of subdividers 52. Two subdividers 52 are present in the shown embodiment, partitioning internal chamber 24 into three subchambers 26. Each of two subchambers 26 holds one vacuum tumbling container 40, and the third subchamber 26 holds one cooking grate 38. Vacuum tumbling containers 40 are shown partially hidden. In another embodiment, two subdividers 52 each partition internal chamber 24 into two subchambers 26, for a total of four subchambers 26.

Figure 12:
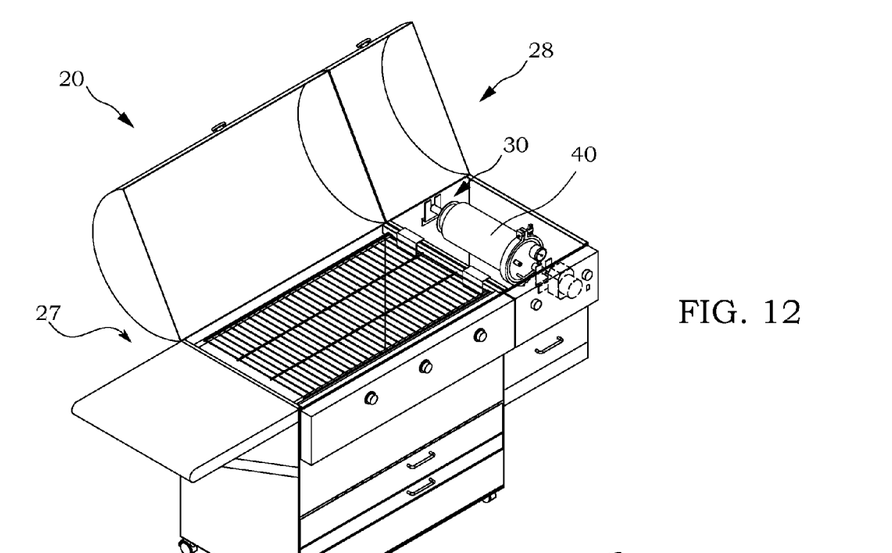
FIG. 12 is a reduced perspective view of another embodiment of the apparatus.
Figure 13:
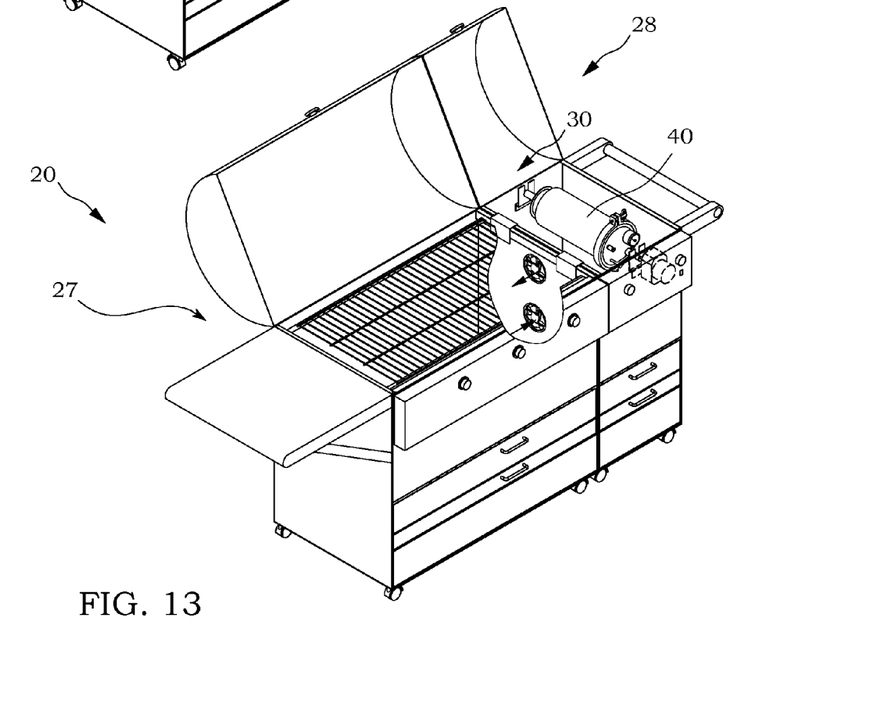
FIG. 13 is a reduced perspective view of another embodiment of the apparatus.
Figure 14:
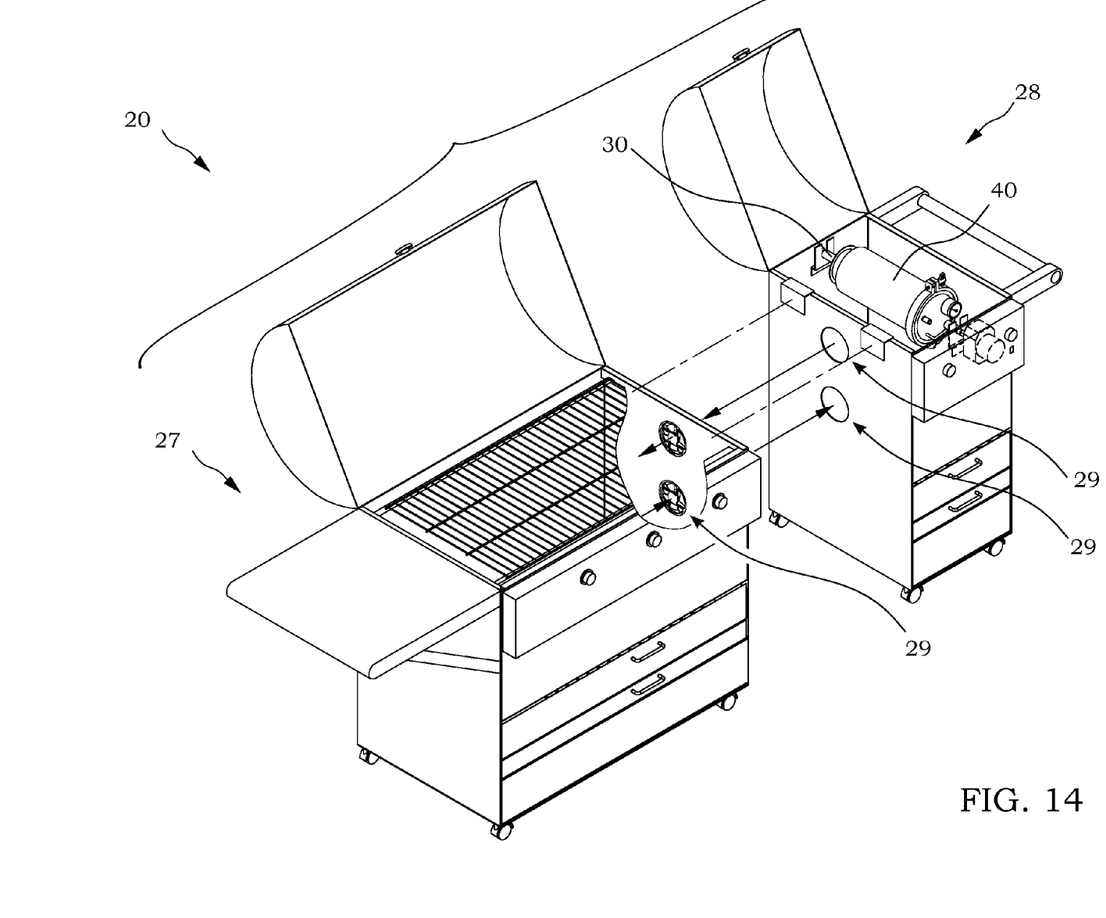
FIG. 14 is a reduced exploded perspective view of another embodiment of the apparatus.

FIG. 12-13 are reduced perspective views of additional embodiments of the apparatus 20 further including a first chamber 27 and a second chamber 28 removably affixed to first chamber 27. Vacuum tumbling container 40 is rotatably connectable to second chamber 28 via connector 30. FIG. 14 is an exploded perspective view of the embodiment of FIG. 13. In the shown embodiment, second chamber 28 hooks on to the side of first chamber 27. In this manner, second chamber 28 forms a portable barbecue with vacuum tumbling container 40. This portable barbecue is useful when camping, picnicking, tailgating or the like. Alternatively, when affixed to first chamber 27, second chamber 28 is useful as a side firebox when indirectly cooking food in first chamber 27. Apertures 29 are positioned to allow air to flow between the first and second chambers. One or more apertures may be present to facilitate air flow, as indicated by the arrows of FIG. 14.

Figure 15:
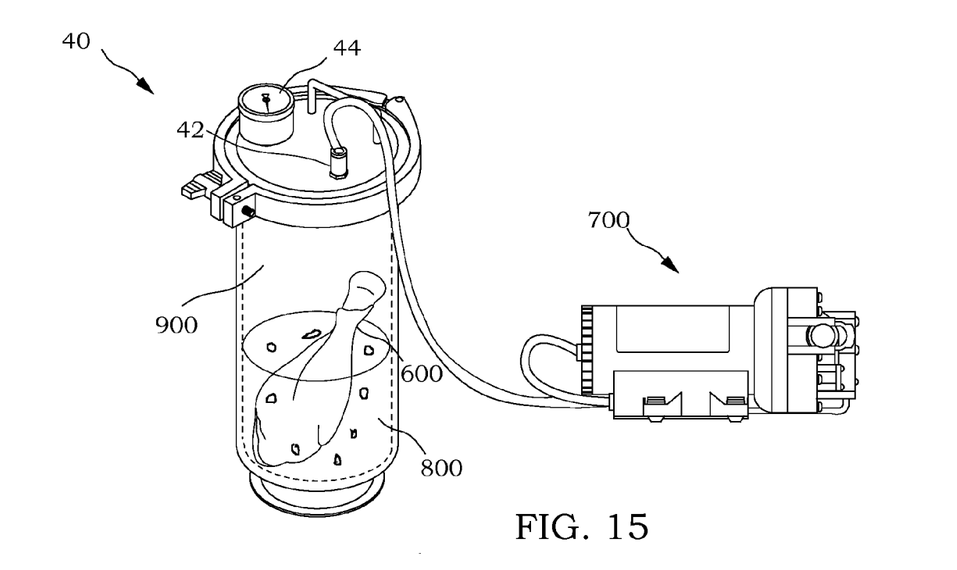
FIG. 15 is an enlarged perspective view of the vacuum tumbling container with a cooperating vacuum pump.

FIG. 15 is an enlarged perspective view of vacuum tumbling container 40 containing food 600, marinade 800, and air 900, shown with a cooperating vacuum pump 700. Vacuum pump 700 is connected to vacuum valve 42 of vacuum tumbling container 40. Vacuum tumbling container 40 is shown transparent to clearly illustrate the contents.

Figure 16:
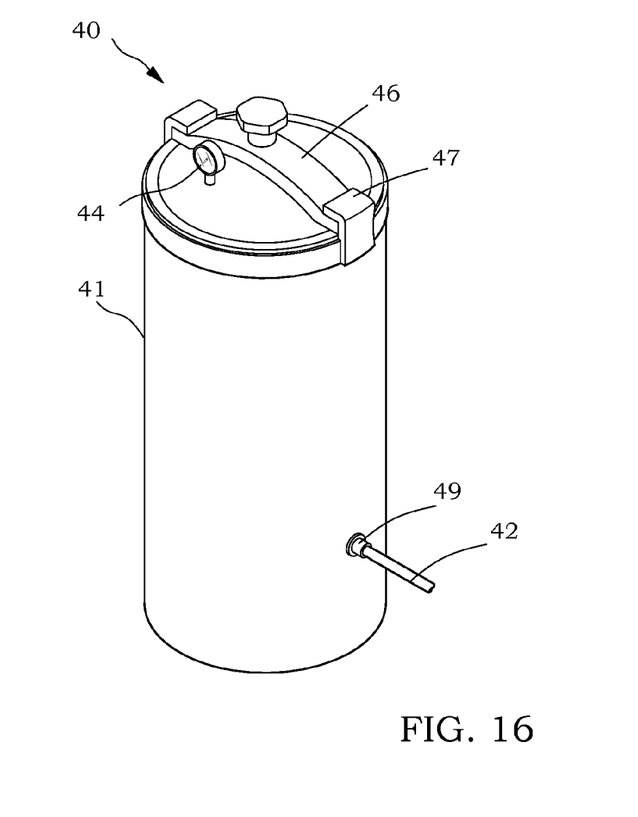
FIG. 16 is an enlarged perspective view of another embodiment of the vacuum tumbling container.
Figure 17:
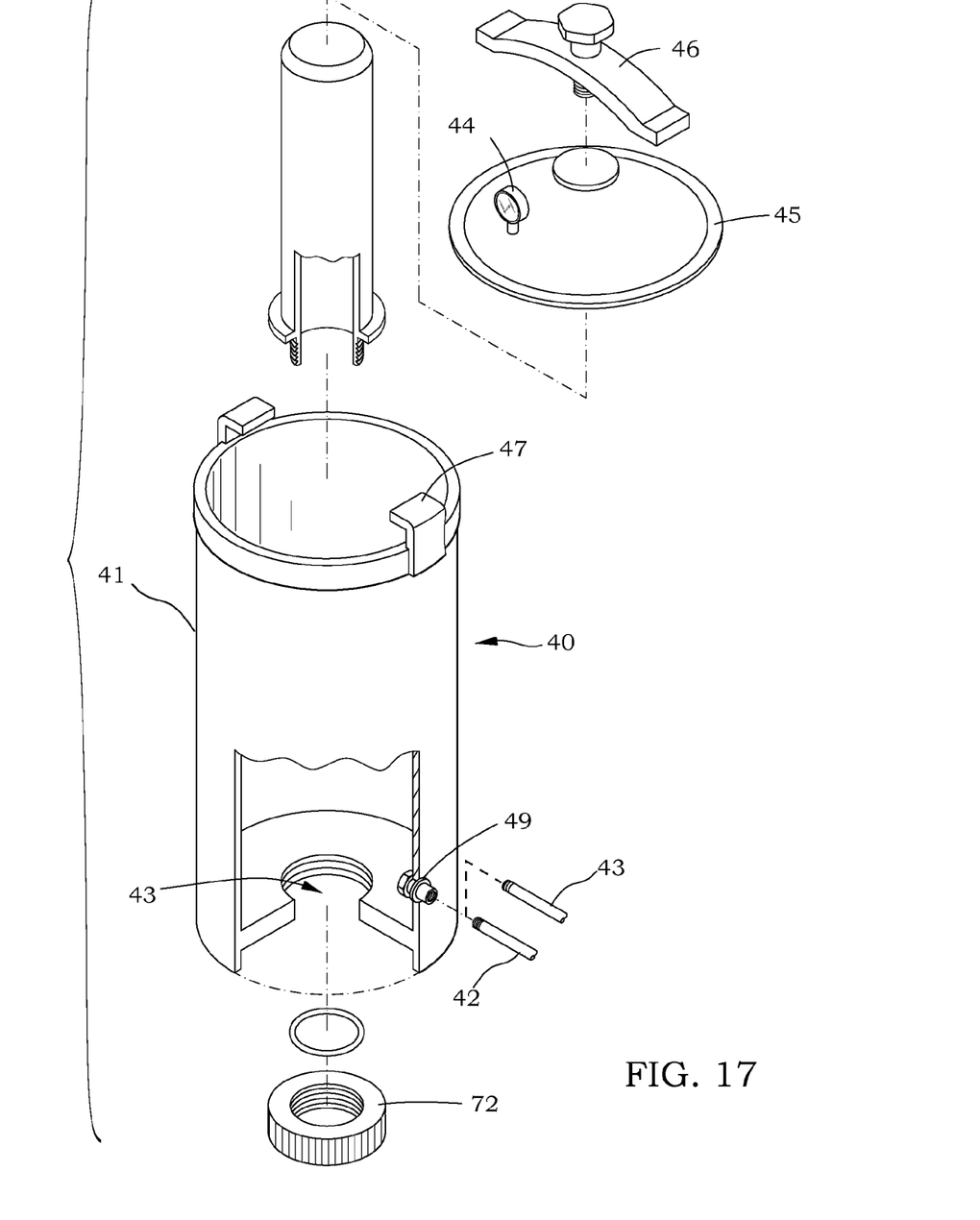
FIG. 17 is an exploded enlarged perspective view of the of the vacuum tumbling container embodiment of FIG. 16.
Figure 18:
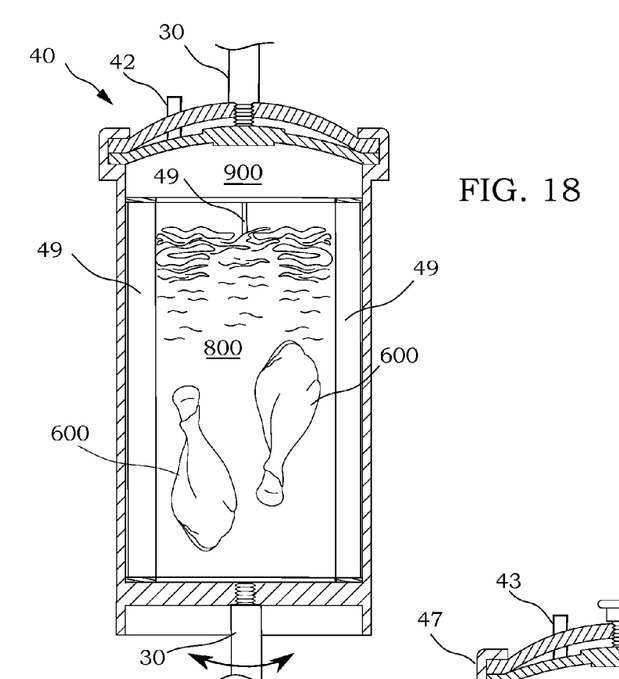
FIG. 18 is an enlarged cross-sectional view of the vacuum tumbling container being used to marinate food.
Figure 19:
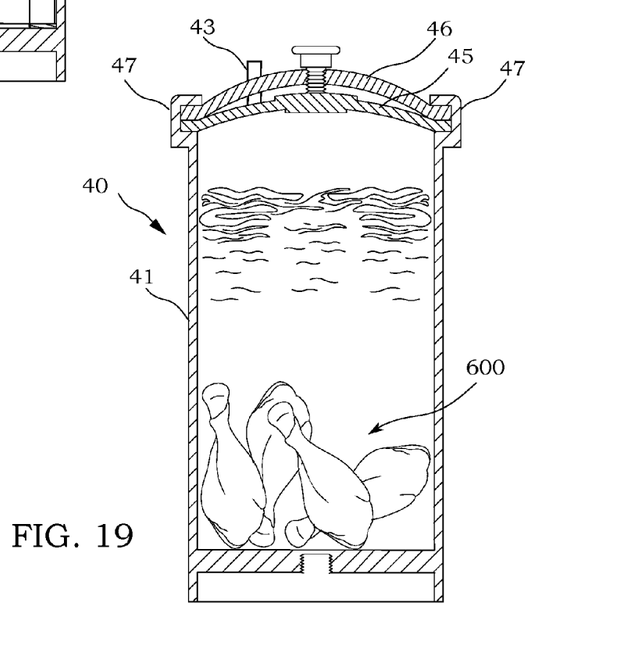
FIG. 19 is an enlarged cross-sectional view of the vacuum tumbling container being used as a pressure cooker.

FIGS. 16 and 17 are enlarged perspective and exploded enlarged perspective views, respectively, of another embodiment of vacuum tumbling container 40. Vacuum tumbling container 40 has a body 41. Vacuum valve 42 is shown removably connectable to body 41. This feature allows vacuum valve 42 to be removed and replaced by other parts so that vacuum tumbling container 40 may serve multiple functions. In one embodiment, vacuum valve 42 is interchangeable with an over-pressure release valve 43. FIGS. 18 and 19 are enlarged cross-sectional views of vacuum tumbling container 40 being used, respectively, to marinate food 600 and as a-pressure cooker for food 600.

When used to marinate food 600, vacuum tumbling container 40 contains food 600, marinade 800, and air 900 which is evacuated by connecting vacuum pump 700 to vacuum valve 42 as shown in FIG. 15. Vacuum tumbling container 40 is connected to connector 30. In the shown embodiment threaded connections to connector 30 are made in the bottom of vacuum tumbling container 40 and handle 46. However, vacuum tumbling container 40 may be connected to connector 30 by various other means well known in the art. When connector 30 is rotated (as indicated by the arrow of FIG. 18) vacuum tumbling container 40 also rotates, thereby tenderizing food 600. In the embodiment of FIG. 18, when vacuum tumbling container 40 is rotated, food 600 repeatedly contacts paddles 49, which serve to massage and further tenderize the food.

Vacuum tumbling container 40 is detachable from connector 30 and serves functions other than vacuum tumbling. Vacuum tumbling container 40 is further operable as a pressure cooker. As shown in the embodiments of FIGS. 16-19, vacuum tumbling container 40 includes a lid 45, a handle 46, and a locking mechanism used to lock lid 45 by positioning handle 46 under two latches 47. This locking mechanism seals lid 45 to body 41 when vacuum tumbling container 40 is used for marinating under vacuum pressure or as a pressure cooker, independently of barbecue 22.

Vacuum valve 42 and over-pressure release valve 43 may be simultaneously connected to vacuum tumbling container 40 or interchangeably connected to vacuum tumbling container 40. FIGS. 18-19 show vacuum valve 42 and over-pressure release valve 43 interchangeably connected to lid 45. In another embodiment, vacuum tumbling container 40 has two lids, a first lid with vacuum valve 42 connected to be used for vacuum tumbling and a second lid with over-pressure release valve 43 connected to be used for pressure cooking. Pressure gauge 44 is optionally included.

Figure 20:
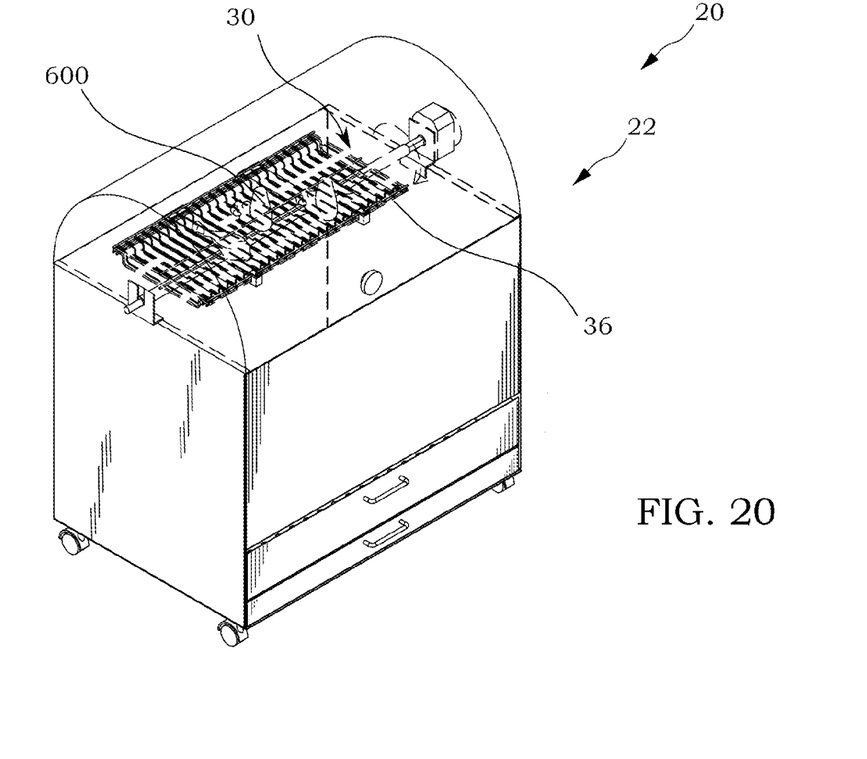
FIG. 20 is a reduced perspective view of the apparatus showing rotation of the cooking structure and the food.

FIG. 20 is a reduced perspective view of apparatus 20 including connector 30 of barbecue 22. Barbecue 22 is shown transparent to clearly illustrate cooking structure 36 and food 600 contained within. The arrow indicates general direction of motion when using barbecue 22 to cook food 600 in the rotisserie style.

In terms of use, a method for vacuum tumbling and barbecuing food 600 includes: (refer to FIGS. 1-20)
(a) providing a vacuum pump 700;
(b) providing food 600 and a marinade 800;
(c) providing an apparatus 20 for vacuum tumbling and barbecuing food 600, apparatus 20 including:
   a barbecue 22;
   a vacuum tumbling container 40 shaped and dimensioned to rotatably connect to barbecue 22;
   vacuum tumbling container 40 having a vacuum valve 42 and containing air 900;
(d) placing food 600 and marinade 800 in vacuum tumbling container 40;
(e) connecting vacuum pump 700 to vacuum valve 42;
(f) operating vacuum pump 700 for a period of time sufficient to partially evacuate air 900 from vacuum tumbling container 40;
(g) rotatably connecting vacuum tumbling container 40 to barbecue 22;
(h) rotating vacuum tumbling container 40 for a period of time sufficient to marinate food 600;
(i) removing food 600 from vacuum tumbling container 40; and,
(j) using barbecue 22 to cook food 600.

The method further including:
in (c):
   barbecue 22 having a rotatable connector 30;
   barbecue 22 having an enclosure 34 removably affixed to connector 30;
   vacuum tumbling container 40 shaped and dimensioned to fit inside said enclosure 34; and,
in (g), rotatably connecting vacuum tumbling container 40 to barbecue 22 by placing vacuum tumbling container 40 in enclosure 34.

The method further including:
in (c), enclosure 34 operable as a cooking structure 36 so that when vacuum tumbling container 40 is removed from enclosure 34, enclosure 34 receiving food 600 for barbecuing; and, after (i), placing food 600 in enclosure 34.

The method further including:

in (c):

barbecue 22 having an internal chamber 24;

a divider 50 shaped and dimensioned to fit inside internal chamber 24 of barbecue 22;

before (g), placing divider 50 inside internal chamber 24 of barbecue 22, divider 50 partitioning internal chamber 24 into a plurality of subchambers 26; and, in (g), rotatably connecting vacuum tumbling container 40 to barbecue 22 by placing vacuum tumbling container 40 in one subchamber 26.

A method for vacuum tumbling and pressure cooking food 600, includes:

(a) providing a vacuum pump 700;

(b) providing food 600 and a marinade 800;

(c) providing an apparatus 20 for vacuum tumbling and pressure cooking food 600, apparatus 20 including:

a rotatable connector 30;

a vacuum tumbling container 40 connectable to connector 30;

vacuum tumbling container 40 having a body 41, a lid 45, and a locking mechanism for locking lid 45 to body 41, a vacuum valve 42, and an over-pressure release valve 43; and, vacuum tumbling container 40 containing air 900;

(d) placing food 600 and marinade 800 in vacuum tumbling container 40;

(e) locking lid 45 to body 41;

(f) connecting vacuum pump 700 to vacuum valve 42;

(g) operating vacuum pump 700 for a period of time sufficient to partially evacuate air 900 from vacuum tumbling container 40;

(h) connecting vacuum tumbling container 40 to rotatable connector 30;

(i) rotating vacuum tumbling container 40 for a period of time sufficient to marinate food 600;

(j) disconnecting vacuum tumbling container 40 from rotatable connector 30; and, (k) using vacuum tumbling container 40 to pressure cook food 600.

The method further including:

in (c), apparatus 20 further including, vacuum valve 42 and said over-pressure release valve 43 being interchangeably connectable to vacuum tumbling container 40;

before (f), connecting vacuum valve 42 to vacuum tumbling container 40; and, before (k), interchanging vacuum valve 42 with over-pressure release valve 43.

The embodiments of the apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims.

I claim:

1. An apparatus for vacuum tumbling and barbecuing food, the apparatus comprising:

a barbecue having an internal chamber and a rotational drive mechanism;

a rotatable connector positioned within said internal chamber and connected to said rotational drive mechanism;

a vacuum tumbling container removably attached to said connector so that when said connector rotates said vacuum tumbling container also rotates; and, said vacuum tumbling container having a vacuum valve.

2. The apparatus according to claim 1, further including:

said barbecue having an enclosure removably attached to said rotatable connector; and, said vacuum tumbling container shaped and dimensioned to fit inside said enclosure.

3. The apparatus according to claim 2, further including:

said enclosure operable as a cooking structure so that when said vacuum tumbling container is removed from said enclosure, said enclosure receives the food for barbecuing.

4. The apparatus according to claim 1, further including:

said barbecue having a cooking grate;

a divider shaped and dimensioned to fit inside said internal chamber; and, when placed inside said internal chamber, said divider partitioning said internal chamber into a plurality of subchambers, each said subchamber shaped and dimensioned to hold at least one of said vacuum tumbling container and said cooking grate, so that said vacuum tumbling container may be operated in one of said subchambers while food is simultaneously cooked on said cooking grate in another of said subchambers.

5. The apparatus according to claim 4, further including:

said divider including a plurality of subdividers.

6. The apparatus according to claim 1, further including:

said barbecue having a cooking grate;

said barbecue having an enclosure removably affixed to said rotatable connector;

said vacuum tumbling container shaped and dimensioned to fit inside said enclosure;

said enclosure operable as a cooking structure so that when said vacuum tumbling container is removed from said enclosure, said enclosure receives the food for barbecuing;

a divider shaped and dimensioned to fit inside said internal chamber of said barbecue; and, when placed inside said internal chamber of said barbecue, said divider partitioning said internal chamber into a plurality of subchambers, each said subchamber shaped and dimensioned to hold at least one of said vacuum tumbling container and said cooking grate.

7. The apparatus according to claim 1, further including:

said barbecue having a first chamber and a second chamber removably attached to said first chamber; and, said vacuum tumbling container rotatably connectable to said second chamber.

8. The apparatus according to claim 7, further including:

an aperture positioned to allow air to flow between said first chamber and said second chamber.

9. The apparatus according to claim 1, further including:

said vacuum tumbling container having a body and a lid;

said vacuum tumbling container having a locking mechanism for locking said lid to said body so that when said lid is locked to said body said vacuum tumbling container being operable as a pressure cooker; and, said vacuum tumbling container having an over-pressure release valve.

10. The apparatus according to claim 9, further including:
said vacuum valve and said over-pressure release valve being interchangeably connectable to said vacuum tumbling container.

11. A method for vacuum tumbling and barbecuing food, comprising:
(a) providing a vacuum pump;
(b) providing food and a marinade;
(c) providing an apparatus for vacuum tumbling and barbecuing said food, said apparatus including:
   a barbecue having an internal chamber and a rotational drive mechanism;
   a rotatable connector positioned within said internal chamber and connected to said rotational drive mechanism;
   a vacuum tumbling container removably attached to said connector so that when said connector rotates said vacuum tumbling container also rotates; and,
   said vacuum tumbling container having a vacuum valve and containing air;
(d) placing said food and said marinade in said vacuum tumbling container;
(e) connecting said vacuum pump to said vacuum valve;
(f) operating said vacuum pump for a period of time sufficient to partially evacuate said air from said vacuum tumbling container;
(g) rotatably connecting said vacuum tumbling container to said barbecue;
(h) rotating said vacuum tumbling container for a period of time sufficient to marinate said food;
(i) removing said food from said vacuum tumbling container; and,
(j) using said barbecue to cook said food.

12. The method according to claim 11, further including:
in (c), said apparatus further including:
   said barbecue having a rotatable connector;
   said barbecue having an enclosure removably attached to said rotatable connector; and,
   said vacuum tumbling container shaped and dimensioned to fit inside said enclosure; and,
in (g), rotatably connecting said vacuum tumbling container to said barbecue by placing said vacuum tumbling container in said enclosure.

13. The method according to claim 12, further including:
in (c), said enclosure operable as a cooking structure so that when said vacuum tumbling container is removed from said enclosure, said enclosure receives said food for barbecuing; and,
after (i), placing said food in said enclosure.

14. The method according to claim 11, further including:
in (c), said apparatus further including:
   said barbecue having a cooking grate; and,
   a divider shaped and dimensioned to fit inside said internal chamber;
before (g), placing said divider inside said internal chamber of said barbecue, said divider partitioning said internal chamber into a plurality of subchambers; and,
in (g), placing said vacuum tumbling container in one said subchamber and placing said cooking grate in another one of said subchambers.

* * * * *

UNITED STATES PATENT AND TRADEMARK OFFICE
CERTIFICATE OF CORRECTION

PATENT NO. : 9,750,273 B2  
APPLICATION NO. : 14/687896  
DATED : September 5, 2017  
INVENTOR(S) : Rogerio Paulo Vicente Cristovao Page 1 of 1

It is certified that error appears in the above-identified patent and that said Letters Patent is hereby corrected as shown below:

In the Claims

Column 10, Line 6, Claim 12:
"said barbecue having a rotatable connector;" should be removed.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*